Figure 1:
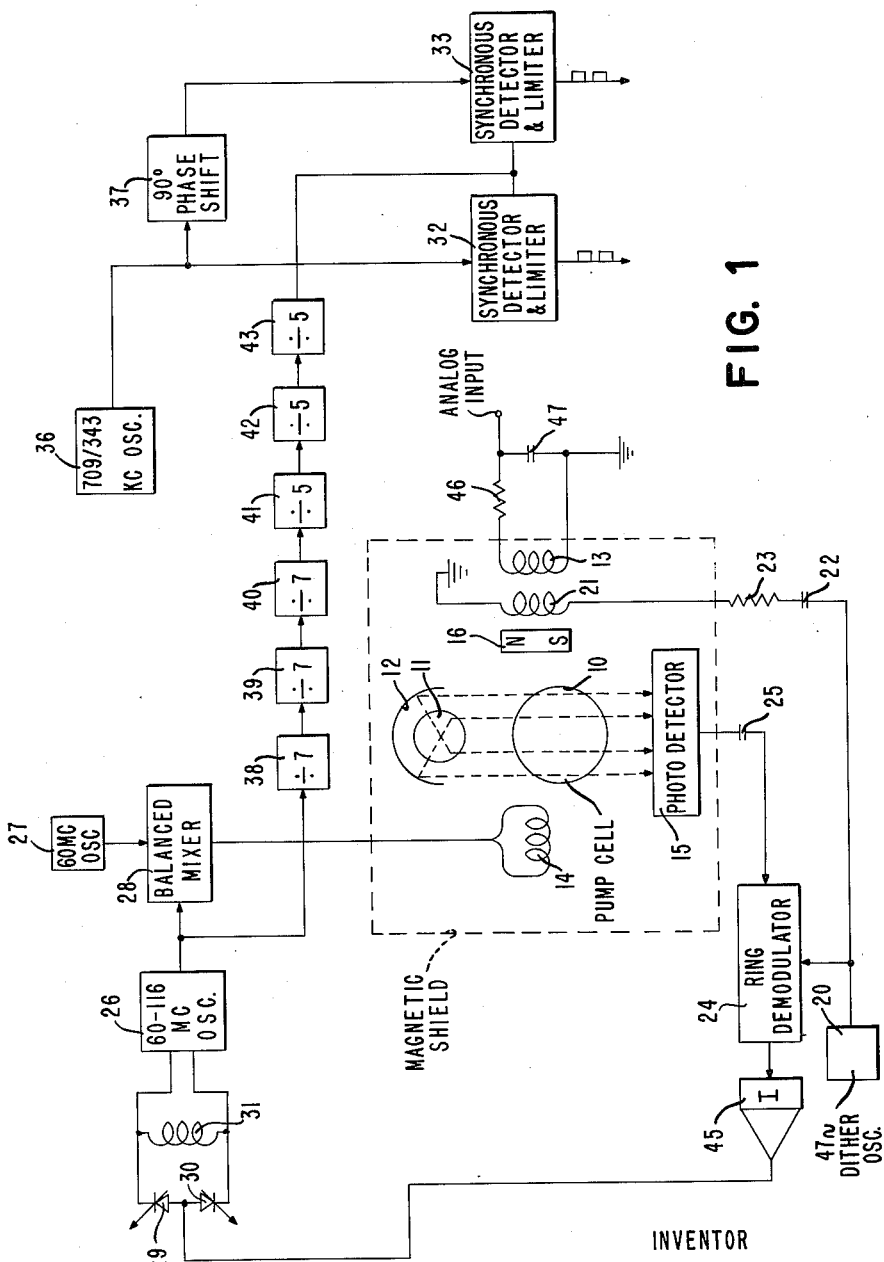

Sept. 7, 1965   S. G. FRANCISCO   3,205,490
ANALOG-TO-DIGITAL CONVERSION MEANS
Filed Aug. 9, 1961   2 Sheets-Sheet 1

INVENTOR
SHERMAN G. FRANCISCO
BY Ralph R Barnard
ATTORNEY

United States Patent Office 3,205,490
Patented Sept. 7, 1965

3,205,490
ANALOG-TO-DIGITAL CONVERSION MEANS
Sherman G. Francisco, Vestal, N.Y., assignor to International Business Machines Corporation, New York, N.Y., a corporation of New York
Filed Aug. 9, 1961, Ser. No. 131,962
7 Claims. (Cl. 340—347)

The present invention relates to electronic translating devices and more particularly to a new and improved means for converting analog information in the form of D.C. current to electrical digital information.

In telemetering, telecommunications, automation and electronic real time control computer fields, it is often desired to convert analog information represented by a direct current of a particular magnitude to electronic digital information. Therein, speed and accuracy are fundamental considerations. For example, in a conventional inertial digital navigation system, it would be extremely desirable for an electrical analog quantity to electrical digital quantity conversion operation to have an accuracy of one part in a hundred million. When such accuracy can be obtained by exclusively electronic instrumentation, the reliability and the speed of the translation becomes comparatively high.

In the prior art there is a class of optical absorption cells often described as light pump cells. These devices in their optical absorption cell application comprise a hollow structure or cell containing a gas such as helium under a low partial pressure. Based on a simplified explanation, the atoms contained in the gas in the presence of a magnetic field can have three energy levels which will be referred to as A, B and C.

Energy levels A and B are relatively low energy conditions and are very close together. The energy difference between them corresponds to a radio frequency spectrum line and initially all the atoms may be considered as being distributed equally between them. Energy level C, on the other hand, is a much higher energy condition and the transitions from energy levels A to C and B to C correspond to lines in the optical part of the spectrum. When the gas is irradiated with a light beam from a source from which the spectral line corresponding to the energy difference between levels B and C has been filtered, the beam contains photon energy which will excite the atoms at level A but not those at level B. The atoms excited out of level A absorb energy and rise to energy level C. They remain there for a short time, emit energy and drop back to level A. Some of the atoms going from level A to C drop back to level B and progressively, given enough time, most atoms will end up in the B level and the gas is said to be in its completely pumped condition.

In its completely pumped condition the transparency of the gas to the light beam is at its best and the degree of transparency represents a measure of the degree of pumping. Accordingly, at the lowest level of pumped condition, the gas absorbs a maximum amount of light while at the complete or nearly complete pumped condition the gas absorbs very little light and is relatively transparent. The atoms at energy level B will eventually decay to energy level A, so as to decrease the transparency of the gas.

In order to aid in the timely replenishing of the atoms to energy level A from energy level B, a critically tuned weak radio frequency magnetic field may be applied to the gas under low partial pressure so as to restore the energy cycle and maintain the gas in its maximum photon energy absorption condition. On the other hand, when a steady state magnetic field is applied in parallel with the light rays, it disrupts the energy cycle in that it changes the distance between the B and A energy levels and reduces the number of atoms at level A which is available for pumping. Accordingly, for each magnitude of a steady-state magnetic field applied in parallel with the light rays there is a particular critically tuned weak radio frequency magnetic field which will maintain light pump in a pumping condition.

In summary, the steady state magnetic field tends to change the critically tuned weak radio frequency magnetic field which will sustain pumping in the confined gas.

An article entitled "Optical Pumping," pages 72–80 of the periodical Scientific American, dated October 1960, describes the aforementioned operation of a light pump in more detail than described herein.

This relationship between a radio frequency magnetic field and a steady state magnetic field constitutes a basis for relating an analog electrical current with electrical digital information in a highly accurate manner.

It is the primary object of the present invention to provide a new and improved means for electrically converting an electrical quantity to electrical digital information.

It is another object of the present invention to provide a new and improved means for converting an electrical quantity to electrical digital information with a high degree of accuracy.

It is still another object of the present invention to provide a new and improved means for electrically converting an electrical quantity to electrical digital information at a high speed.

It is a further object of the present invention to provide a new and improved means for converting an electrical quantity to electrical digital information using a light pump cell field with a gas under low partial pressure.

The objects of the present invention are obtained by utilizing a cell having confined therein a gas under low partial pressure in combination with a light source so arranged to pass a light beam through the confined gas, the light source being particularly selected as to its spectrum in accordance with the gas being utilized so that the light source will cause a phenomenon in the gas known as light pumping. The presence of a condition of maximum light pumping is determined by the confined gas absorbing very little of the photon energy from the light source and is characterized by a minimum light beam transmissibility as seen by the light sensitive device at a point adjacent the confined gas remote from the source. The presence of a condition of minimum light pumping is determined by the gas absorbing the maximum amount of photon energy characterized by the minimum light beam transmissibility through the confined gas. A source of critically tuned radio frequency magnetic field adjacent the gas and applied at right angles to the light beam will decrease the light transmissibility to a minimum. A source of steady-state or low frequency magnetic field applied to the gas in parallel with the light beam will tend to increase the light transmissibility of the confined gas and change the critical frequency for the radio frequency magnetic field which will decrease the light transmissibility of the confined gas to a minimum. By utilizing the electrical output of the light cell device to change the frequency of the radio frequency magnetic field to its critical value and deriving the steady state or low frequency magnetic field in accordance with the analog current to be converted, a closed loop operation will cause the frequency of the radio frequency magnetic field to correspond to the digital equivalent of the analog current to be converted. By known electronic translating means, the frequency of the radio frequency magnetic field may be sampled and a digital quantity derived which is commensurate with the analog current to be converted and usable in the particular system application.

The foregoing and other objects, features and advantages of the invention will be apparent from the following more particular description of the preferred embodiment of the invention as illustrated in the accompanying drawings.

Figure 2:
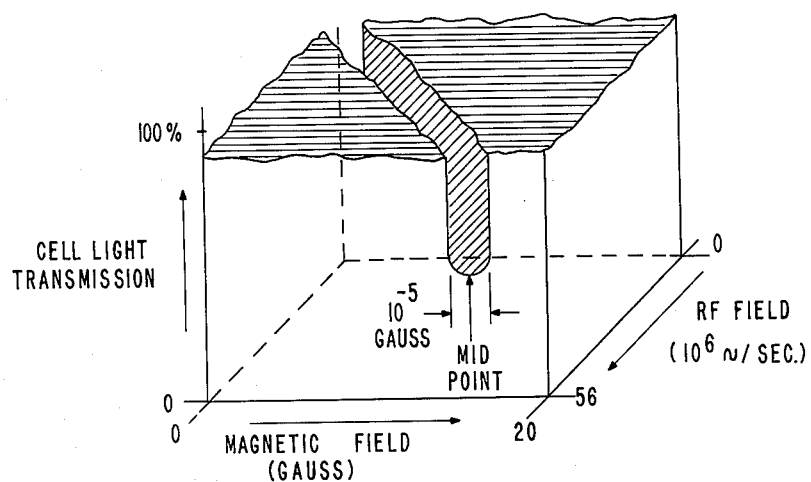

In the drawings:

FIG. 1 shows an exemplary electrical block diagram of the light pump cell used as electrical analog current to an electrical digital information converter in accordance with the teachings of the present invention; and FIG. 2 shows a graphical illustration of a gauss shadow notch as a function of the magnetic field resulting from the analog current to be converted as a function of the frequency of the oscillating field being applied to the gas at right angles to the light transmission.

Referring now to FIG. 1, there is shown a light pump cell 10 having confined therein an appropriate gas such as helium under low partial pressure. A lamp 11 is properly positioned to pass a light beam through the gas in the pump cell, as shown. Reflector 12 is utilized to give the light rays the necessary direction. Based on a simplified explanation, the atoms contained in the helium gas can have three energy levels which will be referred to as A, B and C. Energy levels A and B are relatively low energy conditions and are very close together. The energy difference and transition between levels A and B correspond to a particular code frequency spectrum line and initially all of the atoms may be considered as being distributed equally between them. Energy level C, on the other hand, is a much higher energy condition and the transitions from energy levels A to C and B to C correspond to frequency lines in the optical part of the spectrum. When the confined helium gas under low partial pressure is irradiated with a light beam from a source which the frequency spectral line corresponding to energy level difference between lines B and C has been filtered, the photon energy from the beam will excite the atoms at level A but not those at level B. By way of example, helium light source 11 may be used for this purpose when the confined gas is helium. The atoms excited out of level A as a result of absorbing energy will rise to energy level C. They will remain there for a short time, emit energy and tend to drop back to level A. However, some of the atoms going from level A to C drop back to level B and progressively, given enough time, every atom will end up in the B level and the gas is said to be in its completely pumped condition.

In its completely pumped condition, the transparency of the gas to the light beam is at its best and the degree of transparency represents a measure of the degree of pumping. Accordingly, at the lowest level of pumped condition (maximum pumping), the gas absorbs a maximum amount of light, while at the complete or nearly complete pumped condition the gas absorbs very little light and is relatively transparent. Atoms at energy level B will eventually decay to energy level A so as to decrease the transparency of the gas.

In FIG. 1, in order to aid in the timely replenishing of the atoms in energy level A from energy level B, a critically tuned weak radio frequency magnetic field may be applied via coil 16 to the confined helium gas in cell 10. As a result, the energy cycling is restored and the helium is maintained in its maximum photon energy absorbing condition. The photo cell 15 may be used to measure the photon energy absorption condition of the helium in cell 10. The radio frequency magnetic field applied via coil 14 is applied in a direction perpendicular to the light rays of the beam from source 11.

On the other hand, when a steady-state magnetic field such as provided by permanent magnet 16 and solenoid 13 is applied to the confined gas in parallel with the light rays of the light beam it tends to disrupt the energy cycle in that it restrains the complete decay of the atoms from level B to level A and reduces the number of atoms at level A which are available for pumping. Accordingly, there is a relationship between the effect of the radio frequency magnetic field being applied by coil 14 to the gas and the steady-state magnetic field being applied to the gas as determined by photon energy absorption qualities of gas. This relationship may be stated by the proposition that a change in the magnitude of the steady-state magnetic field will change the critical frequency at which the radio frequency magnetic field will restore the maximum light pumping condition.

FIG. 2 illustrates this relationship as three dimensional. The dependent variable of the light pump is the photon energy absorption qualities of the confined gas. The independent variables of the light pump are the magnitude of the steady-state magnetic field being applied by the magnet 16 and the solenoid 13 and the frequency of the radio frequency magnetic field being applied by the coil 14. The relationship between the two independent variables which result in the maximum photon energy absorption (virtual shadow) is the nature of a physical constant determined by the type for gas. For example, confined helium under low partial pressures will exhibit a virtual shadow over a wide temperature range represented by the physical constant $2.8 \times 10^6$ cycles per sec. per gauss. Moreover, as FIG. 2 represents, this shadow has a $10^{-5}$ gauss notch.

As shown, for a radio frequency field being applied to coil 14 at a frequency extending from zero (0) to $56 \times 10^6$ cycles per sec., there is a corresponding magnetic field provided by coil 13 measured in gauss which will provide a virtual shadow. Any deviation of the steady-state magnetic field provided by coil 13 (or another source) in excess of $10^{-5}$ gauss will require a different radio frequency to be applied to coil 14 in order to derive a maximum shadow as seen from the remote side of pump cell 10 with respect to source 11. Conventional photo detector circuitry 15 may be utilized to generate a voltage or current depending on the type of detector in accordance with the magnitude of the shadow. When the radio frequency of the magnetic field applied by coil 14 bears a relationship with the magnitude of the magnetic field provided by coil 13 in gauss, such that the shadow notch of the diagram of FIG. 1 is characteristic of the relationship therebetween, the D.C. voltage or current generated by photo detector 15 is a minimum.

Permanent magnet 16 may be used to provide a magnetic field bias within the confined gas equal to ten gauss so that the operating point is in the midpoint of the relationship of FIG. 2. In the absence of another source of a magnetic field a virtual shadow would then be present when the frequency of the RF feed applied to coil 16 is $28 \times 10^6$ cycles/sec. If an analog current is applied to solenoid 13 the steady magnetic field being applied to the confined gas is modified, the frequency of the RF field being applied by coil 14 must be changed in order for the vertical shadow as detected by the photo detector 15 to be maintained.

While it is the relationship between the analog current applied to solenoid 13 and the change in frequency of the RF field of coil 14 on which the conversion principles of the present invention depend, the shape of the $10^{-5}$ gauss notch may also be utilized to determine the polarity of any error therebetween. To obtain the polarity of the error an additional source of a magnetic field is provided by a low frequency low voltage source 20. This source is applied to a solenoid 21 through an A.C. coupling capacitor 22 and resistor 23. By way of example, the source 20 may be a 47 cycles per sec. standard oscillatory frequency source (dither oscillator) of conventional design. Because of the low frequency and the fact that the magnetic field is applied to the confined gas in the same direction as the steady-state magnetic field, it has the same effect as if it were a varying current being applied by a solenoid 13. The magnitude of this source is selected so that the steady-state magnetic field varies cyclically through a range of approximately $10^{-6}$ gauss so that midpoint of the notch may be determined to within $10^{-7}$ gauss (milli notch). The selected magnitude of the dither oscillator will vary with the practical application. Accordingly, referring to FIG. 2, the coordinate representing the steady-state magnetic field will synchronously vary and the phase of the fundamental component of the electrical output of the photo detection circuit 15 will be determined by the polarity of the error between the midpoint of the cycle variation, and the midpoint of the shadow notch as determined by the frequency of the RF field.

Synchronous detection of this shadow modulation may be obtained by applying the output of photo detector 15 to a conventional ring demodulator 24 through an A.C. coupling capacitor 25. The reference frequency for the ring demodulator is the same 47 cycle dither oscillator 20 which provides the source for coil 21. When magnetic field sources 16 and 13 provide a composite steady-state magnetic field within the confined gas that corresponds with the appropriate RF frequency determined by the midpoint of the shadow notch of FIG. 2, the average voltage output of ring demodulator 24 is zero. On the other hand, when the analog current being applied to solenoid 13 increases the composite steady-state magnetic field being applied to the confined gas beyond the value which corresponds to the RF field of coil 14 as determined by the midpoint of the shadow notch of FIG. 2, an average voltage of one polarity is generated at the output of ring demodulator 24. On the other hand, if the current level in solenoid 13 is modified so that the composite steady-state magnetic field being applied to the confined gas is less than the magnetic field determined by the RF frequency of coil 14 and the midpoint of the shadow notch of 52, the average voltage output of the ring demodulator 24 has the other polarity.

In order to modify the RF frequency so that it bears the relationship with respect to the steady-state magnetic field shown by the shadow notch of FIG. 2, the average voltage output from ring demodulator 20 may be applied to the input of a conventional integrating amplifier 45 which in turn will integrate the error and apply a voltage to the tuned circuit of a conventional oscillator 26. In order to provide the variable RF field shown in FIG. 2 with a range between zero and $56 \times 10^6$ cycles per sec., oscillator 26 was constructed to have an output range of frequencies between $60 \times 10^6$ to $116 \times 10^6$ cycles per sec. The output of oscillator 26 is then mixed with another oscillator source 27 in a balanced mixer 28 so as to provide the aforementioned range of frequencies. Oscillator 27 may be a conventional crystal control oscillator and is shown operating at $60 \times 10^6$ cycles per second. The difference between the frequency of oscillator 27 and the variable oscillator 26 is taken within the balanced mixer and applied to RF field coil 14.

The output of integrator 25 is used to vary the frequency of variable oscillator 26 via a tuned circuit including two capacitor diodes 29 and 30 which coact with an inductor 31. The capacitor diodes are standard electronic components which operate in a manner such that the capacitance between their terminals is varied as a function of the voltage being applied. It should be noted that capacitor diode 29 has an orientation which is opposite to capacitor diode 30. The purpose of the opposing orientation of the capacitor diodes is to prevent loading of the coil 31 through rectification of the RF voltage of the associated oscillator.

In summary, when the current level in solenoid 13 changes, photo detector circuit 15, capacitor 25 and ring demodulator 24 will generate an average error voltage having a polarity which is appropriate to drive the frequency of oscillator 26 in a direction such that the output of balanced mixer 28 will be of the proper frequency to re-establish the relationship shown in FIG. 2. Specifically the coordinates of the RF frequency provided by coil 14 and the composite steady-state magnetic field provided by solenoids 13 and 21 and permanent magnet 16 intersect at the midpoint of the notch.

The relationship between the RF frequency coil 14 and the current in solenoid 13 can be shown to be linear over a large temperature range and it is useful in converting an analog current to a digital quantity. It is only necessary to determine the frequency change required to re-establish the relationship of FIG. 2 following the application of that current to solenoid 13. Moreover, to convert from a digital quantity to an analog current, it is only necessary to change the frequency being applied to coil 14 in accordance with the digital quantity and determine the direction and the magnitude of the current change which must be applied to solenoid 13 to re-establish the relationship of FIG. 2.

In order to convert the frequency change in RF coil 14 necessary to bring about this re-establishment of the FIG. 2 relationship to meaningful digital information, many electronic translating techniques may be used. For example, the output of oscillator 26 will be passed through a succession of frequency divider circuits 38–43 for the purpose of reducing the frequency to a relatively low data rate. Following the frequency division to a relatively low data rate, the variable frequency may be applied to two synchronous detection and limiter circuits 32 and 33 for the purpose of converting the carrier to pulse type information. Synchronous detector 32 may be energized from the reference frequency source directly and synchronous detector 33 may be energized from the same source via a 90° phase shift circuit, whereupon, the synchronous detection circuits generate voltage pulses each having a repetitious rate corresponding to the deviation of the frequency of RF coil 14 as required by the characteristic of FIG. 2 for changes in the analog current level in the solenoid 13. The phase relationship between the voltage pulses on the output of the synchronous detectors is indicative of the direction of the frequency change of RF coil 14 and the polarity of the current level change in solenoid 13. Oscillator 36 may be a conventional crystal control oscillator and 90° phase shift circuit 37 may be constructed with a conventional technique.

By way of example, assuming that the biasing magnetic field provided by magnet 16 is used to set the operating point of the pump cell so that the corresponding critical radio frequency as determined from the relationship of FIG. 2 is $28 \times 10^6$ cycles per second, oscillator 26 will have a center frequency at $88 \times 10^6$ cycles per sec. without any analog current flowing in solenoid 13. Frequency division circuits 38 through 43 reduce the frequency output by a factor of 42,875 for application to the synchronous detectors 32 and 33. Assuming oscillator 36 has an output frequency (709/343 kc.) equal to $88 \times 10^6 \div 42,875$, synchronous detectors 32 and 33 have no pulse outputs. Assuming an analog current is applied to solenoid 13 of a particular polarity and magnitude, the critical frequency for radio frequency field 14 will change in accordance with the relationship shown in FIG. 2. The output of photo detector 15 will have a 47 cycle fundamental voltage which has been phase shifted in accordance with the magnitude of the analog current and in a direction determined by the direction of the current in solenoid 13. Ring demodulator 24 will convert the detector voltage waveform to an average voltage level having a polarity determined by the direction of the phase shift of the fundamental and integrator 45 will integrate the average voltage so that the output frequency of oscillator 26 is changed in a direction to cause the radio frequency magnetic field applied by coil 14 to be changed toward the critical frequency established by the relationship shown in FIG. 2. When the radio frequency magnetic field applied by coil 14 reaches the critical frequency, the output of ring demodulator 24 becomes zero. The output of the oscillator 26 and the frequency divider 43 is changed by an amount commensurate with the analog current applied to solenoid 13 which it is desired to convert to digital information. The two inputs of each of synchronous detectors 32 and 33 are no longer at the same frequency and the pulse rate of the voltage pulses being derived in the output of each is commensurate with the analog current. Moreover, the phase relationship of the voltage pulse output of detectors 32 and 33 indicate the direction of the analog current. If the direction of the analog current applied to solenoid 13 had been reversed, the output demodulator 24 would have been an average voltage of the opposite polarity and the frequency shift in the output of oscillator 26 would have been in the other direction from the operating point frequency. The phase relationship of the voltage pulses in the output of synchronous detectors 32 and 33 would have been determined by the direction of the analog current being applied to the solenoid 13. The fact that the error voltage in the output of demodulator 24 is integrated has several advantages. It decreases the steady error of the control loop and it minimizes the dependence of the conversion on precision power supplies and time references.

In FIG. 1, a resistor 46 is shown connected in series with solenoid 13 and a capacitor 47 is shown connected in parallel with the series combination. Resistor 46 and capacitor 47 function as a filter for transient voltages being applied to the solenoid along with the analog current to be converted. Ring demodulator 24 functioning as a synchronous detector may be of several constructions. By way of example, such a circuit is shown in FIG. 15.13, page 563 of a textbook entitled Waveforms, Radiation Laboratory Series No. 19, published by the McGraw-Hill Book Company, Inc., 1949. The frequency division circuits shown by a block 38 to 53 may be of several constructions. By way of example, such frequency division circuits are shown in FIG. 14.24, page 519, of the same textbook entitled Waveforms, further identified hereinabove. The synchronous detectors 32 and 33 may be of the same general construction as ring demodulator 24 except that each contains a conventional limiter circuit for the purpose of shaping the voltage pulse outputs.

When the teachings of the present invention are utilized to convert digital information to analog information, the frequency being applied to oscillator 26 may be varied and the output of integrator 45 may be applied to the analog input terminal.

While the invention has been particularly shown and described with reference to a preferred embodiment thereof, it will be understood by those skilled in the art that various changes in form and details may be made therein without departing from the spirit and scope of the invention.

What is claimed is:

1. An analog-to-digital converting system comprising a conventional light pump including a photo detection circuit for detecting the transmissibility of light therethrough, a source of radio frequency magnetic field associated with said light pump, the light transmissibility of said light pump being decreased by the modification of the frequency of said radio frequency source toward a critically tuned frequency, a source of a steady-state magnetic field associated with said light pump, the magnitude of said steady-state magnetic field determining the critically tuned frequency of said radio frequency magnetic field, means for changing the magnitude of said steady-state magnetic field in accordance with the magnitude of an analog current to be converted and in the direction determined by the polarity of the analog current to be converted, said photo detection circuit detecting an increase in the light transmissibility of said light pump so as to produce an error voltage, said error voltage being applied to said source of radio frequency magnetic field so as to modify the frequency thereof toward the critically tuned frequency determined by said steady-state magnetic field, said frequency change of said radio frequency magnetic field representing the digital equivalent of said analog current to be converted.

2. An analog-to-digital converting system comprising a conventional light pump including a photo detection circuit for detecting the transmissibility of light therethrough, a source of radio frequency magnetic field associated with said light pump, the light transmissibility of said light pump being decreased by the modification of the frequency of said radio frequency source toward a critically tuned frequency, a source of a steady-state magnetic field associated with said light pump, the magnitude of said steady-state magnetic field determining the critically tuned frequency of said radio frequency magnetic field, means for changing the magnitude of said stead-state magnetic field in accordance with the magnitude of an analog current to be converted and in the direction determined by the polarity of the analog current to be converted, said photo detection circuit detecting an increase in the light transmissibility of said light pump so as to produce an error voltage, said error voltage being applied to said source of radio frequency magnetic field so as to modify the frequency thereof toward the critically tuned frequency determined by said steady-state magnetic field, said frequency change of said radio frequency magnetic field representing the digital equivalent of said analog current to be converted, electronic translating means for converting a sample commensurate with said frequency change of said radio frequency magnetic field to a digital pulse train having a frequency commensurate with the analog current to be converted and a phase relationship with a reference in accordance with the polarity of the analog current to be converted.

3. An analog-to-digital converting system comprising a conventional light pump including a photo detection circuit for detecting the transmissibility of light therethrough, a source of radio frequency magnetic field associated with said light pump, the light transmissibility of said light pump being decreased by the modification of the frequency of said radio frequency source toward a critically tuned frequency, a source of a steady-state magnetic field associated with said light pump, the magnitude of said steady-state magnetic field determining the tuned frequency of said radio frequency magnetic field, means for changing the magnitude of said steady-state magnetic field in accordance with the magnitude of an analog current to be converted and in the direction determined by the polarity of the analog current to be converted, said photo detection circuit detecting an increase in the light transmissibility of said light pump so as to produce an error voltage, said error voltage being applied to said source of radio frequency magnetic field so as to modify the frequency thereof toward the critically tuned frequency determined by said steady-state magnetic field, said frequency change of said radio frequency magnetic field representing the digital equivalent of said analog current to be converted, a source of a variable magnetic field being applied to said light pump in parallel with said steady-state magnetic field source, a source of a biasing magnetic field to provide a magnetic field bias level in said light pump, said bias magnetic field said low frequency magnetic field and said steady-state magnetic field co-acting with said light pump so as to oscillate the light transmissibility of the light pump, a synchronous detector connected to be responsive to said photo-detector means to provide an average error voltage output having a polarity indicative of the direction said radio frequency magnetic field source must be changed for it to be returned to the critically tuned frequency, a D.C. voltage integrator connected to receive an input of said error voltage, said source of radio frequency magnetic field being varied in frequency in accordance with the output of said integrator.

4. An electronic translating system comprising a conventional light pump including a photo-detection for detecting the transmissibility of light therethrough, a source of radio frequency magnetic field associated with said light pump, a source of a steady-state magnetic field associated with said light pump, the magnitude of said steady-state magnetic field and said radio frequency source being related within said light pump to determine the light transmissibility thereof, said photo-detection circuit detecting the variations in the light transmissibility of said light problem so as to produce an error voltage, the relationship between said steady-state magnetic field and said radio frequency magnetic field being adjusted to obtain a minimum light transmissibility within said light pump, said adjustment of said steady-state and radio frequency magnetic fields being used to convert information from one form to another.

5. An analog-to-digital converting system comprising a cell having confined therein a gas under low partial pressure, a light source so arranged to pass a light beam through said confined gas, said gas and said light source being particularly selected so that said light source will cause a phenomenon in said gas known as light pumping, maximum light pumping is determined by the confined gas absorbing a maximum of the photon energy from said source characterized by a minimum light beam transmissibility through said confined gas, minimum light pumping being determined by said gas absorbing the minimum of photon energy characterized by a maximum light beam transmissibility through said confined gas, a source of a radio frequency magnetic field adjacent said confined gas for applying said magnetic field at right angles to said light beam, the light transmissibility of said confined gas being decreased by the modification of the frequency of said radio frequency magnetic field toward a critically tuned frequency, a source of steady-state magnetic field for applying a magnetic field parallel to said light beam, increases in the magnitude of said steady-state magnetic field acting to increase the light transmissibility of said confined gas, means for changing the frequency of said radio frequency magnetic field toward said critically tuned frequency, means for changing the magnitude of said steady-state magnetic field in accordance with the magnitude of the analog current to be converted, said light cell device detecting the instantaneous magnitude of the light transmissibility of said confined gas so as to produce a feedback quantity to change the frequency of said radio frequency magnetic field, when the light beam transmissibility of said confined gas is driven to be a minimum change of the frequency of said radio frequency magnetic field corresponds to the digital equivalent of said analog current to be converted.

6. An analog-to-digital converting system comprising a cell having confined therein a gas under low partial pressure, a light source so arranged to pass a light beam through said confined gas, said gas and said light source being particularly selected so that said light source will cause a phenomenon in said gas known as light pumping, maximum light pumping is determined by the confined gas absorbing a maximum of the photon energy from said source characterized by a minimum light beam transmissibility through said confined gas, minimum light pumping being determined by said gas absorbing the minimum of photon energy characterized by a maximum light beam transmissibility through said confined gas, a source of a radio frequency magnetic field adjacent said confined gas for applying said magnetic field at right angles to said light beam, the light transmissibility of said confined gas being decreased by the modification of the frequency of said radio frequency magnetic field toward a critically tuned frequency, a source of steady-state magnetic field for applying a magnetic field parallel to said light beam, increases in the magnitude of said steady-state magnetic field acting to increase the light transmissibility of said confined gas, means for changing the frequency of said radio frequency magnetic field toward said critically tuned frequency, means for changing the magnitude of said steady-state magnetic field in accordance with the magnitude of the analog current to be converted, said light cell device detecting the instantaneous magnitude of the light transmissibility of said confined gas so as to produce a feedback quantity to change the frequency of said radio frequency magnetic field, when the light beam transmissibility of said confined gas is driven to be a minimum the frequency of said radio frequency magnetic field corresponds to the digital equivalent of said analog current to be converted, electronic translating means for converting a sample commensurate with the change in said radio frequency magnetic field to a digital pulse train having a frequency commensurate with the analog current to be converted and a phase relationship with a reference in accordance with the polarity of the analog current to be converted.

7. An analog-to-digital converting system comprising a cell having confined therein a gas under low partial pressure, a light source so arranged to pass a light beam through said confined gas, said gas and said light source being particularly selected so that said light source will cause a phenomenon in said gas known as light pumping, maximum light pumping is determined by the confined gas absorbing a maximum of the photon energy from said source characterized by a minimum light beam transmissibility through said confined gas, minimum light pumping being determined by said gas absorbing the minimum of photon energy characterized by a maximum light beam transmissibility through said confined gas, a source of a radio frequency magnetic field adjacent said confined gas for applying said magnetic field at right angles to said light beam, the light transmissibility of said confined gas being decreased by the modification of the frequency of said radio frequency magnetic field toward a critically tuned frequency, a source of steady-state magnetic field for applying a magnetic field parallel to said light beam, increases in the magnitude of said steady-state magnetic field acting to increase the light transmissibility of said confined gas, means for changing the frequency of said radio frequency magnetic field toward said critically tuned frequency, means for changing the magnitude of said steady-state magnetic field in accordance with the magnitude of the analog current to be converted, a source of low frequency alternating current known as a dither oscillator, a source of a variable magnetic field for applying a low frequency varying magnetic field in parallel with said steady-state source in response to said dither oscillator, a source of a biasing magnetic field to provide a bias level in said steady-state magnetic field to provide a bias level in said steady-state magnetic field source, said biasing magnetic field, said low frequency magnetic field and said magnetic field commensurate with the analog current to be converted coacting with said radio frequency magnetic field so as to slowly oscillate the light transmissibility of said confined gas around a maximum transmissibility condition when the average output of said light detecting circuit is applied to a D.C. voltage integrator which in turn drives said radio frequency magnetic field toward a critical frequency for said confined gas as determined by the magnitude of the analog current to be converted, the change in the frequency of said critically tuned radio frequency magnetic field corresponds to the digital equivalent of said analog current to be converted.

References Cited by the Examiner
UNITED STATES PATENTS 2,951,992  9/60  Arditi _____ 331—94 XR

FOREIGN PATENTS 1,228,868  3/60  France.

MALCOLM A. MORRISON, *Primary Examiner.*